US009167554B1

(12) United States Patent
Sjölund et al.

(10) Patent No.: US 9,167,554 B1
(45) Date of Patent: Oct. 20, 2015

(54) METHOD AND SYSTEM FOR TRACKING COMMUNICATION DEVICES IN A RADIO COMMUNICATION NETWORK IN A FACILITY

(71) Applicant: Walkbase Oy, Turku (FI)

(72) Inventors: Björn Sjölund, Turku (FI); Niclas Jern, Turku (FI); Gabriel Nyman, Mariehamn (FI)

(73) Assignee: WALKBASE OY, Turku (FI)

( * ) Notice: Subject to any disclaimer, the term of this patent is extended or adjusted under 35 U.S.C. 154(b) by 0 days.

(21) Appl. No.: 14/503,059

(22) Filed: Sep. 30, 2014

(51) Int. Cl.
*H04W 64/00* (2009.01)
*H04W 48/04* (2009.01)
*H04W 4/02* (2009.01)

(52) U.S. Cl.
CPC .............. *H04W 64/003* (2013.01); *H04W 4/02* (2013.01); *H04W 48/04* (2013.01)

(58) Field of Classification Search
CPC ....................................................... H04W 64/00
USPC ........................................... 455/456.1–456.6
See application file for complete search history.

(56) References Cited

U.S. PATENT DOCUMENTS

| 6,674,403 | B2 | 1/2004 | Gray et al. |
| 7,899,006 | B2 | 3/2011 | Boyd |
| 8,478,290 | B2 | 7/2013 | Yoeli |
| 2006/0046709 | A1 | 3/2006 | Krumm et al. |
| 2012/0284112 | A1* | 11/2012 | Pradeep et al. ............ 705/14.41 |
| 2014/0057651 | A1 | 2/2014 | Lin et al. |
| 2014/0171114 | A1* | 6/2014 | Marti et al. ................ 455/456.2 |

FOREIGN PATENT DOCUMENTS

CN 103561462 A 2/2014

OTHER PUBLICATIONS http://dl.acm.org/citation.cfm?id=1410023, Proximity classification for mobile devices using wi-fi environment similarity; ACCM Digital Library 2008; Abstract.

* cited by examiner

*Primary Examiner* — Michael T Vu
(74) *Attorney, Agent, or Firm* — Ziegler IP Law Group, LLC.

(57) ABSTRACT

The present disclosure provides a method and system for tracking one or more portable communication devices in a radio communication network in a facility. The system comprises two or more sensors and a server. Each of the two or more sensors is configured to record a radio signal strength corresponding to each of one or more radio signal probes from each of the one or more portable communication devices, by utilizing a corresponding media access control address of each of the one or more portable communication devices. The server is configured to determine a location coordinate of each of the one or more portable communication devices using the recorded radio signal strengths and an adaptive supervised machine learning system. A learning cycle of the adaptive supervised machine learning system is configured to initiate when a variation in one or more technical attributes of the radio communication network in the facility is detected.

16 Claims, 7 Drawing Sheets

METHOD AND SYSTEM FOR TRACKING COMMUNICATION DEVICES IN A RADIO COMMUNICATION NETWORK IN A FACILITY

TECHNICAL FIELD

The present disclosure relates to the field of communication network, and in particular, relates to tracking communication devices in a communication network.

BACKGROUND

In today's competitive business scenario, most of the companies try to take an edge over others by gathering and analyzing more and more data. The data can be profile information of their customer(s)/potential customer(s)/user(s), counting of the number of customers that has entered their store, and the like. For example, a retail chain owner may like to collect data corresponding to the number of users entered in a particular store and relate the sales with the number of customer entering that store. In addition, the retail chain owner may like to collect the number of people having entered into a particular section of the store. These types of detailed analysis help companies to not only increase their sales but also take strategic marketing decision.

In the last decade, solutions involving radio-communication network in a facility to track mobile devices inside the facility are being utilized to make inferences about the customer(s)/potential customer(s). These solutions are commonly referred to as indoor positioning systems. Some of these indoor positioning systems utilize technical parameters like received signal strength indictor (RSSI) from access points (APs), configuration parameters of sensors, etc. for tracking the mobile devices inside the facility.

However, these technical parameters along with other factors vary with highly dynamic environment, thereby reducing the chances of development of accurate and stable indoor positioning system. For example, radio signals propagate in a complicated manner and are often affected by noise and other sources. This results in unstable and noisy signal strength readings. In addition, the physical characteristics in an indoor setting (for example, walls, furniture, computers, and elevators) affect the Received Signal Strength Indication (RSSI). Further, movement of users within an indoor environment adversely affects the RSSI as human indoor movement tends to be less predictable. Furthermore, accidentally switching off the power plugs of components of the positioning system by clerk, cleaner and the like without notifying the server system do affect the tracking. Moreover, remodeling of the premises (for example, shops) in which the components are attached to movable positions (for example, shelf, racks and the like) also affect the tracking.

In addition, most of the present indoor positioning systems implement a trilateration technique to track the mobile devices. The trilateration is a high level mathematical method of determining an absolute location of a point by measurements of distances using geometry of circles, spheres, triangles and the like. Further, the trilateration finds practical applications in surveying and navigation, including global positioning systems (GPS). However, it does not involve the measurement of angles. In addition, due to a complex and dynamic environment, the trilateration gives only approximate results. Thus, improvements are needed in the trilateration process to improve location accuracy. Another method used presently to count and track position of one or more users includes methods done by door counters. For example, door counter methods include video feed based counters, ultrasonic counters, infrared beam counters, carpet (pressure) sensors and the like. The video feed based counters are advanced stereo vision tracking technologies to count data under a broad set of environmental conditions. However, the door by door counters are unreliable when several people move in and out from the premises at same time.

In light of the above stated discussion, there is a need for a method and system that overcomes the above stated disadvantages.

SUMMARY

The present disclosure seeks to provide an improved system for tracking one or more portable communication devices in a radio communication network in a facility.

The present disclosure also seeks to provide an improved method for tracking one or more portable communication devices in a radio communication network in a facility.

A further aim of the present disclosure is to at least partially overcome at least some of the problems of the prior art, as discussed above.

In one aspect, an embodiment of the present disclosure provides a system for tracking one or more portable communication devices in a radio communication network in a facility. The system comprises two or more sensors and a server. Each of the two or more sensors are configured to record a radio signal strength corresponding to each of one or more radio signal probes from each of the one or more portable communication devices, by utilizing a corresponding media access control address of each of the one or more portable communication devices. The server is configured to determine location coordinate of each of the one or more portable communication devices using the recorded radio signal strength and an adaptive supervised machine learning system. A learning cycle of the adaptive supervised machine learning system is configured to initiate when a variation in one or more technical attributes of the radio communication network in the facility is detected.

In another aspect, an embodiment of the present disclosure provides a method for tracking one or more portable communication devices in a radio communication network in a facility. The method comprises steps of recording radio signal strength corresponding to each of one or more radio signal probes from each of the one or more portable communication devices by utilizing a corresponding media access control address of each of the one or more portable communication devices, determining location coordinate of each of the one or more portable communication devices using the recorded radio signal strengths and an adaptive supervised machine learning system and initiating a learning cycle of the adaptive supervised machine learning system when a variation in one or more technical attributes of the radio communication network in the facility is detected.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
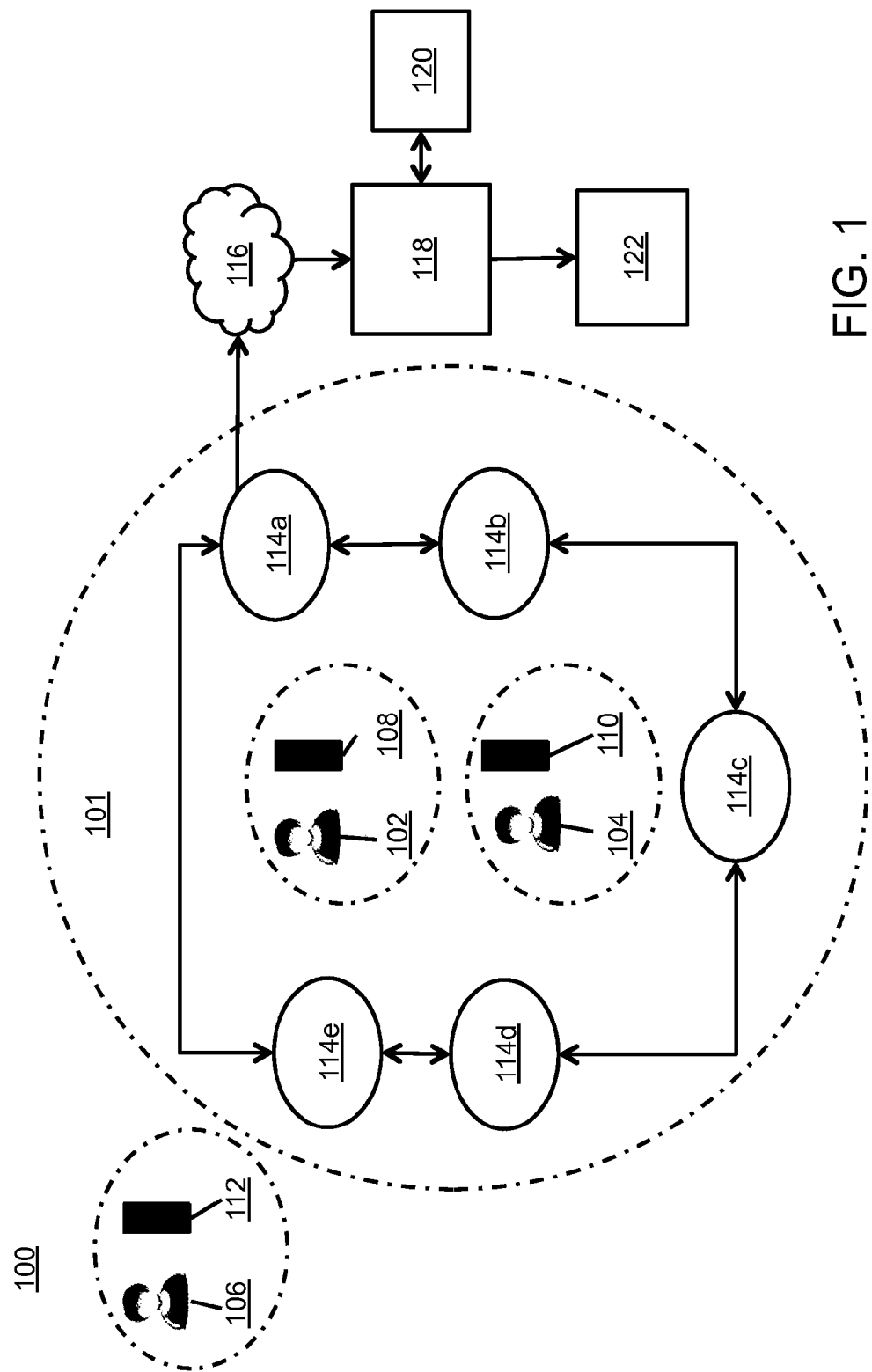
FIG. 1 illustrates a system for tracking one or more portable communication devices in a radio communication network in a facility according to an embodiment.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect of the present disclosure, a method and system for tracking one or more portable communication devices in a radio communication network in a facility is provided. The system comprises two or more sensors and a server. Each of the two or more sensors are configured to record a radio signal strength corresponding to each of one or more radio signal probes from each of the one or more portable communication devices, by utilizing a corresponding media access control address of each of the one or more portable communication devices. The server is configured to determine location coordinate of each of the one or more portable communication devices using the recorded radio signal strength and an adaptive supervised machine learning system. A learning cycle of the adaptive supervised machine learning system is configured to initiate when a variation in one or more technical attributes of the radio communication network in the facility is detected.

Optionally, the facility can be a shop, a shopping center, a museum, an indoor stadium or any other enclosure where sensors for a radio communication network can be installed.

The present system may be used to further increase the accuracy of the indoor positioning system, especially in crowded facilities, like shopping centers and malls. The system accuracy is improved with an adaptive machine learning system. Such a system is trained to learn what kind of radio signal probe signatures are outside a predefined area. The training of the system can be arranged to happen when there are only known communication devices inside the area, so that the known communication devices can be filtered out of the training material. Thus the training of the system is beneficial to arrange when the facility, for instance a shop, is closed. After the system is trained, it can recognize those communication devices which are likely to be outside the predefined area, and logically inversely, it can also recognize those devices likely to be inside the predefined area, thus improving the accuracy of the indoor positioning system dilemma presented, namely counting the visitors in a shop. In case the radio environment of the premises changes over a threshold, the system needs to be retrained. Therefore, it is beneficial to measure the radio environment utilising the signalling capability of the sensors.

Optionally, the communication device includes but is not limited to mobile phones, tablets, personal digital assistant (PDAs) or any other portable communication device capable of receiving/transmitting radio signals.

More optionally, the communication devices are the portable communication devices with enabled network connection (WLAN/Wi-Fi).

Optionally, the one or more radio signal probes (Wi-Fi probes) include a list of base stations where the network connection has been active (the communication devices).

Optionally, the communication network includes but is not limited to internet using ADSL (Asynchronous Digital Subscription Line) connection or other means of wired or wireless connection.

The system comprises two or more sensors, i.e. the system may comprise two, three, four, five, six, seven, eight, nine, ten, eleven, twelve, thirteen, fourteen, fifteen, sixteen, seventeen, eighteen or more sensors. This same applies to the method as described below.

Optionally, the sensors are configured to receive one or more radio signal probes from each of the communication devices by utilizing a corresponding media access control address (hereinafter 'MAC') of each of the communication devices. The MAC address is a unique identifier assigned to network interfaces for communications on a physical network segment.

Optionally, the sensors are configured to record radio signal strength using received radio signal strength indicator (hereinafter 'RSSI') values associated with each of the one or more radio signal probes from each of the communication devices. Optionally, the recorded radio signal strength corresponding to each of the one or more radio signal probes is received from each of the communication devices; however those skilled in the art would appreciate that the recorded radio signal strength corresponding to each of the one or more radio signal probes may be received from more or fewer portable communication devices.

Optionally, the sensors are configured to communicate with each other in an ad-hoc manner to form an ad-hoc network to deliver the received information (probe fingerprints). Example of the probe fingerprints includes but may not be limited to the recorded signal strength, MAC address and the RSSI values.

According to an embodiment, the system has at least two sensors. For example, a sensor X and a sensor P, which can scan the air and receive the list of Wi-Fi probes and the media access control address from a mobile device M1 associated with a user U1 (outside a store having the radio communication network facility) and a mobile device M2 associated with a user U2 (inside the store having the radio communication network facility). Further, the sensor X records the Wi-Fi strength corresponding to each of the Wi-Fi probes from the mobile device M1 and the mobile device M2 using their corresponding RSSI values. Moreover, the other sensor P transmits the Wi-Fi strength to the server through the internet network.

Optionally, the one or more technical attributes of the radio communication network in the facility is selected from a group consisting of a reference received signal strength indicator location vector map, location parameters of the two or more sensors in the radio communication network in the facility and configuration parameters of the two or more sensors in the radio communication network in the facility.

According to an embodiment, the server comprises a grouping module configured to group the one or more radio signal probes based on a first set of pre-determined conditions, a filtering module configured to filter the grouped one or more radio signal probes based on a plurality of pre-determined filtering criterion and a storing module configured to store a reference received signal strength indicator location vector map.

Optionally, the first set of pre-determined conditions include grouping of the one or more radio signal probes of the communication device with same MAC address at same time. Continuing with the above stated example, if the mobile device M2 associated with the user U2 moves in and out of the facility one or more times and the signal strength is recorded one or more times, then the grouping module groups these one or more radio signal probes.

Optionally, the plurality of pre-determined filtering criterion includes removing unwanted samples. Examples of unwanted samples include the one or more radio signal probes coming from the devices of the personnel of the facility (for example, the devices of one or more users working in the facility) in the radio communication network of the facility. Further, the pre-determined filtering criterion of the plurality of pre-determined filtering criterion can be time. For example, a user associated with a device can be classified as a valid visitor if its presence in the facility is more than five minutes.

According to an embodiment, the server is configured to receive the recorded radio signal strength corresponding to each of the one or more radio signal probes from each of the one or more portable communication devices from a first sensor of the two or more sensors. The first sensor of the two or more sensors is optionally configured to receive the recorded radio signal strength corresponding to each of the one or more radio signal probes at each of the one or more portable communication devices from the two or more sensors. The server is further optionally configured to transmit a tracking information report pertaining to the tracking of the one or more portable communication devices to a third party.

Optionally, the server is configured to determine the location/position of the mobile device M1 and the mobile device M2 using the received Wi-Fi strength and the adaptive supervised machine learning system and sends the location/position of the mobile device M1 and the mobile device M2 to the third party service (for example, an owner of the store/facility).

According to an embodiment, the adaptive supervised machine learning system operates in two modes including a learning mode and a classification mode. The learning cycle of the adaptive supervised machine learning system is optionally configured to use as training data probe signals collected out-side of business hours of the facility. The system can thus be configured to take into account the actual time and to compare this to the opening hours, i.e. business hours of the facility, or to take into account any other pre-determined time schedule. The business hours can be for example set manually or they can receive the information from a locking system or an alarm system.

Optionally, the adaptive supervised machine learning system is configured to classify the one or more radio signal probes based on at least one pre-defined criterion. The at least one pre-defined criterion is optionally selected from a group consisting of opening hours of the facility and pre-defined media access control addresses.

Optionally, the adaptive supervised machine learning system is configured to classify the probe fingerprints received during the out-side business hours of the facility as the probe finger prints of the one or more communication devices present outside the facility. The adaptive supervised machine learning system may be configured to use these probe finger prints as the one or more training samples and to refer these probe finger prints as outside class. However, the adaptive supervised machine learning system can be configured to classify the probe fingerprints received during the business hours of the facility. The adaptive supervised machine learning system is optionally configured to use these probe finger prints as the one or more training samples and to refer these probe finger prints as inside class.

According to an embodiment, the business hours parameters are set manually.

Alternatively, the business hours parameters are received from a third party source (for example, a locking system of the facility).

Optionally, the probe fingerprints during the in-side business hours are classified based on time of visibility and the probe fingerprint. The probe fingerprints during the in-side business hours include for example the MAC address of each of the communication device, timestamp, sensors and the RSSI values.

Optionally, the storing module is configured to store the reference received signal strength indicator location vector map. The reference received signal strength indicator location vector map (intra-sensor map) includes a table with a pseudo-function. The pseudo-function enables each of the sensors of the two or more sensors to record the MAC address and the RSSI values of each other and transmit the MAC address and the RSSI values pair to the server.

According to an embodiment, the server is configured to train the adaptive supervised machine learning system regularly with samples from the one or more communication devices detected by the sensors during the out-side business hours of the facility. The business hours denote the time. For example, the business hours are described as in-side business hours of the facility ($T_{on}$), when one or more activities are taking place in the facility. Alternatively, the business hours are described as out-side business hours of the facility ($T_{off}$), when little or no activity is taking place in the facility.

Additionally, the server is configured to transmit a tracking information report of tracking of the communication device to the third party service. The third party service can send direct advertisement messages to the communication devices.

Optionally, each of the sensors is configured to receive 1-2 radio signal probes per minute from each of the communication device.

In another aspect of the present disclosure, a method for tracking one or more portable communication devices in a radio communication network in a facility is provided. The method comprises steps of recording radio signal strength corresponding to each of one or more radio signal probes from each of the one or more portable communication devices by utilizing a corresponding media access control address of each of the one or more portable communication devices, determining location coordinate of each of the one or more portable communication devices using the recorded radio signal strengths and an adaptive supervised machine learning system and initiating a learning cycle of the adaptive supervised machine learning system when a variation in one or more technical attributes of the radio communication network in the facility is detected.

According to an embodiment, the step of determining location coordinate comprises grouping the one or more radio signal probes based on a first set of pre-determined conditions, filtering the grouped one or more radio signal probes based on a plurality of pre-determined filtering criterion and storing a reference received signal strength indicator location vector map.

According to an embodiment, the one or more technical attributes of the radio communication network in the facility is selected from a group consisting of a reference received signal strength indicator location vector map, location parameters of the two or more sensors in the radio communication network in the facility and configuration parameters of the two or more sensors in the radio communication network in the facility.

According to an embodiment, the learning cycle of the adaptive supervised machine learning system uses as training data probe signals collected out-side of business hours of the facility.

According to an embodiment, the adaptive supervised machine learning system classifies the one or more radio signal probes based on at least one pre-defined criterion.

According to an embodiment, the at least one pre-defined criterion is selected from a group consisting of opening hours of the facility and pre-defined media access control addresses.

According to an embodiment, the server receives the recorded radio signal strength corresponding to each of the one or more radio signal probes from each of the one or more portable communication devices from a first sensor of the two or more sensors.

According to an embodiment, the first sensor of the two or more sensors receives the recorded radio signal strength corresponding to each of the one or more radio signal probes at each of the one or more portable communication devices from the two or more sensors.

According to an embodiment, the server transmits a tracking information report pertaining to the tracking of the one or more portable communication devices to a third party.

Optionally, the server adjusts the reference received signal strength indicator location vector map based on the detection data.

According to an embodiment, the adjustment is performed due to dynamic nature of the facility. For example, if a user (clerk or cleaner) accidentally pulls off the power plug of one or more sensors or simply moves a sensor from a place to another without notifying the server, the map is updated for showing accurate results.

Optionally, if the facility (for example a store with two or more sensors) is remodeled or layout of the facility is changed, the two or more sensors attached to movable positions (for example, shelves) are moved in the remodeling process and the map is updated for showing accurate results.

DETAILED DESCRIPTION OF THE DRAWINGS

FIG. 1 illustrates a system 100 wherein various embodiment of the present disclosure can be practiced. The system 100 includes a communication device 108 associated with a user 102, a communication device 110 associated with a user 104, a communication device 112 associated with a user 106, sensors 114a-e, a communication network 116, a server 118, an adaptive supervised machine learning system 120 and a third party service 122. The communication devices 108 and 110 associated with the respective users 102-104 are inside the facility 101 and are in the radio communication network of the facility 101. In addition, the communication device 112 associated with the user 106 is outside the facility 101 but is in the radio communication network of the facility 101.

Each of the sensors 114a-e scans air to receive one or more radio signal probes from each of the communication devices 108-112. Further, each of the sensors 114a-e records a radio signal strength corresponding to each of the one or more radio signal probes from each of the corresponding communication devices 108-112. In addition, a sensor (say sensor 114a) of the sensors 114a-e transmits the recorded radio signal strength corresponding to each of the one or more radio signal probes from each of the communication devices 108-112 to the server 118 through the communication network 116.

The server 118 determines a location coordinate of each of the communication device 108-112 using the recorded radio signal strength and an adaptive supervised machine learning system 120 (explained later and illustrated in detailed description for FIG. 2). The adaptive supervised machine learning system 120 deals with construction and study of systems that learns from data, rather than following explicitly programmed instructions. Learning from data means that such a system is trained with data samples that constitute a logical group, so that when later in operation the system recognizes similar data samples, is able to classify the samples. The server 118 sends the location coordinates of each of the communication device 108-112 to the third party service 122. The third party service 122 can send direct advertisement messages to the communication devices 108-112.

Figure 2:
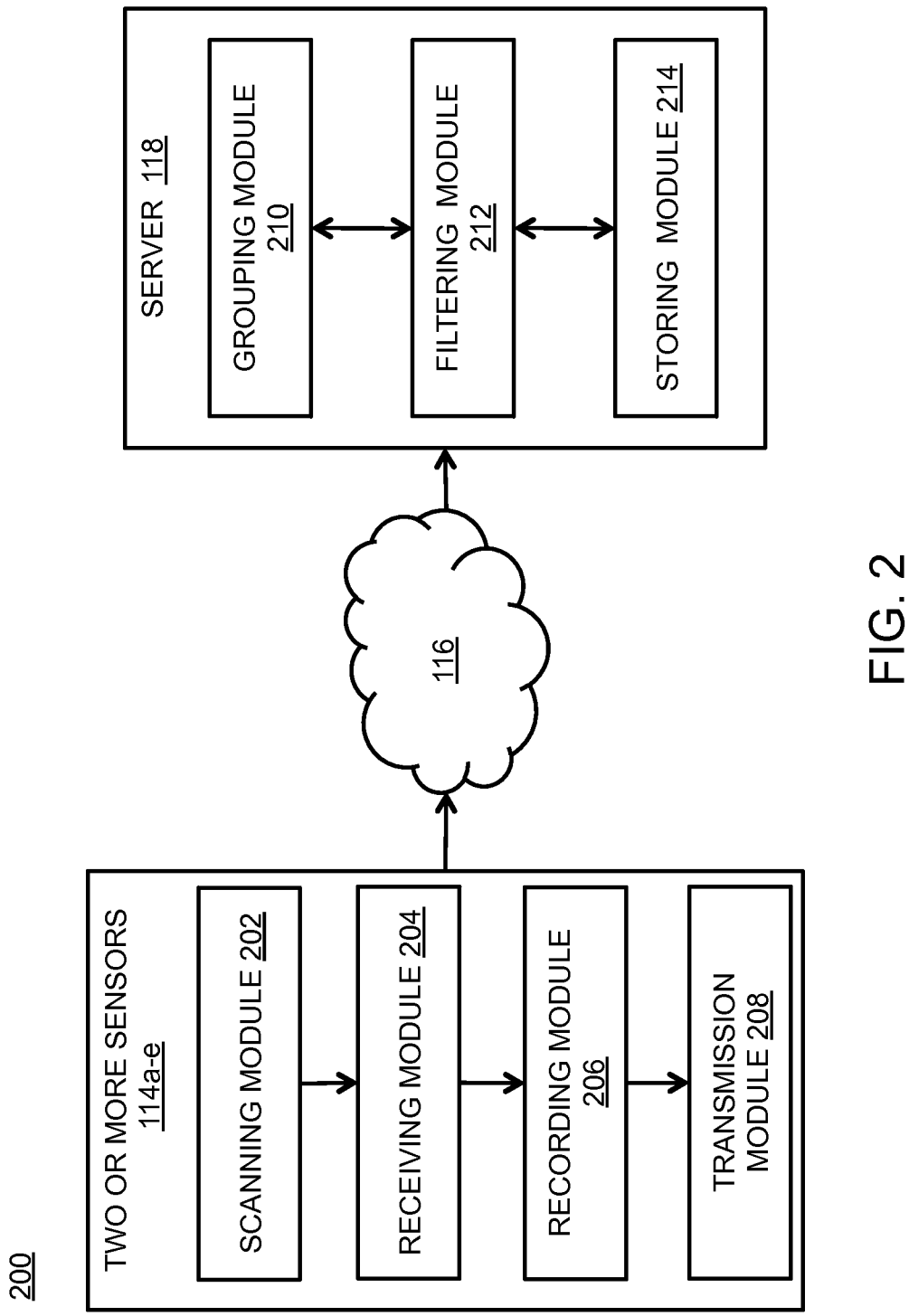
FIG. 2 illustrates an interaction between two or more sensors and a server according to an embodiment.

FIG. 2 illustrates an interaction between the sensors 114a-e and the server 118 through the communication network 116, in accordance with various embodiments of the present disclosure. It may be noted that to explain system 200, references will be made to the system elements of FIG. 1.

The sensors 114a-e include a scanning module 202, a receiving module 204, a recording module 206 and a transmission module 208. The scanning module 202 scans the air to receive the one or more radio signal probes from each of the communication devices 108-112. The receiving module 204 receives the one or more radio signal probes from each of the communication device 108-112. The recording module 206 records radio signal strength corresponding to each of the one or more radio signal probes from each of the communication device 108-112. The recording module 206 records the radio signal strength using the RSSI values associated with each of the one or more radio signal probes from each of the communication devices 108-112. The transmission module 208 transmits received information (probe fingerprints) to the server 118 through the communication network 116.

The server 118 includes a grouping module 210, a filtering module 212 and a storing module 214. The grouping module 210 groups the one or more radio signal probes based on a first set of pre-determined conditions. The filtering module 212 filters the grouped one or more radio signal probes based on a plurality of pre-determined filtering criterion. The storing module 214 stores a reference received signal strength indicator location vector map.

Figure 3:
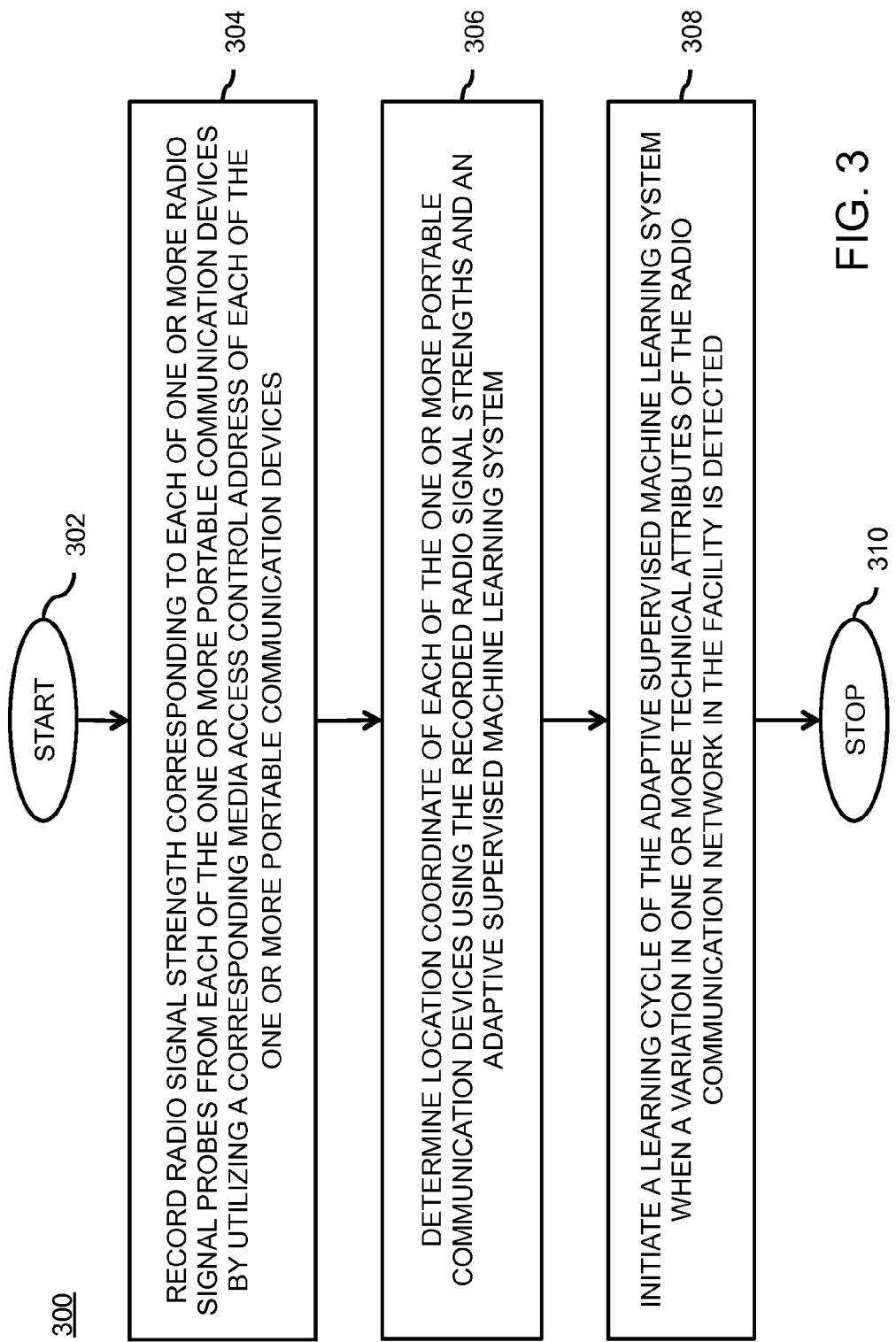
FIG. 3 illustrates a flowchart for tracking the one or more portable communication devices according to an embodiment.

FIG. 3 illustrates a flowchart 300 for tracking one or more portable communication devices in a radio communication network in a facility, in accordance with an embodiment of the present disclosure. Following step 302, at step 304, sensors record radio signal strength corresponding to each of one or more radio signal probes from each of communication device by utilizing the corresponding media access control address of each of the communication device. At step 306, a server determines the location coordinate of each of the communication device using the recorded radio signal strengths and an adaptive supervised machine learning system. At step 308, the adaptive supervised machine learning system initiates the learning cycle when the variation in one or more technical attributes of the radio communication network in the facility is detected. The flowchart 300 terminates at step 310.

The steps 302 to 310 are only illustrative and other alternatives can also be provided where one or more steps are added, one or more steps are removed, or one or more steps are provided in a different sequence without departing from the scope of the claims herein.

Figure 4:
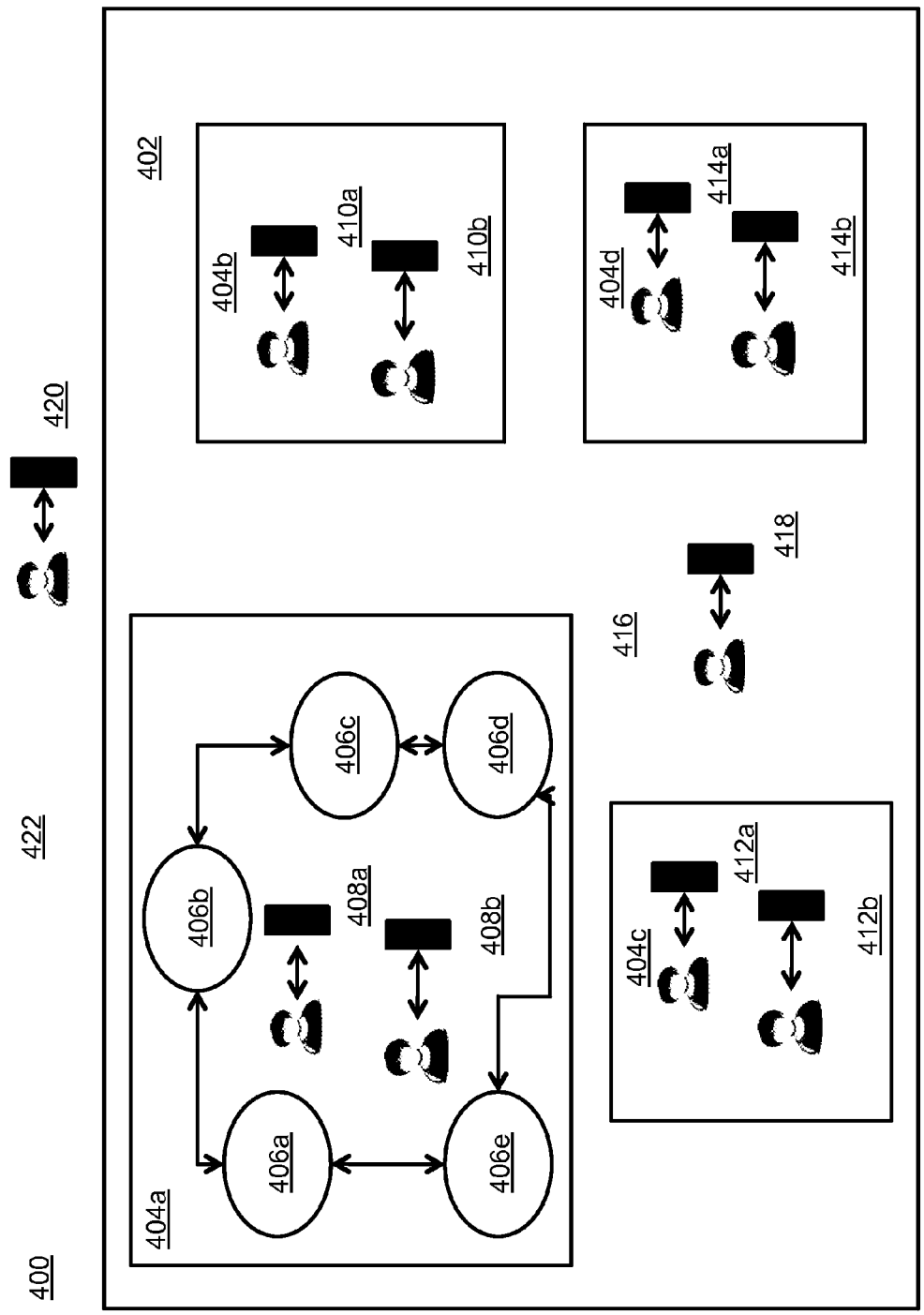
FIG. 4 illustrates an example embodiment for tracking the one or more portable communication devices.

FIG. 4 illustrates a system 400 for showing an example embodiment for tracking the one or more portable communication devices in a radio communication network in a facility, in accordance with an embodiment of the present disclosure. The system 400 includes a shopping mall 402 with a plurality of stores 404a-d. The store 404a includes a radio communication network with a two or more sensors 406a-e. Further, the store 404a includes one or more communication devices 408a-b associated with one or more users W, a store 404b includes one or more communication devices 410a-b associated with one or more users X, a store 404c includes one or more communication devices 412a-b associated with one or more users Y and a store 404d includes one or more communication devices 414a-b associated with one or more users Z. A hallway 416 lies in between the plurality of stores 404a-d in the mall 402. A communication device 418 associated with a user U moves in the hallway 416. In addition, a communication device 420 associated with a user V is on a road 422 outside the shopping mall.

The sensors 406a-e scan the air to receive the one or more radio signal probes from each of the communication devices 408a-b, 410a-b, 412a-b, 414a-b, 418 and 420. Further, the sensors 406a-e record the radio signal strength corresponding to each of the one or more radio signal probes from each of the communication devices 408a-b, 410a-b, 412a-b, 414a-b, 418 and 420. Furthermore, the two or more sensors 406a-e transmit probe fingerprints to a server through a communication network. The server determines the location coordinate of each of the communication device 408a-b, 410a-b, 412a-b, 414a-b, 418 and 420 and transmits the location coordinate of each of the communication device 408a-b, 410a-b, 412a-b, 414a-b, 418 and 420 to a third party service.

The store 404a of the plurality of stores 404a-d includes the two or more sensors 406a-e, however those skilled in the art would appreciate that there may be more stores of the plurality of stores 404a-d which include more/less sensors in the two or more sensors 406a-e.

Figure 5:
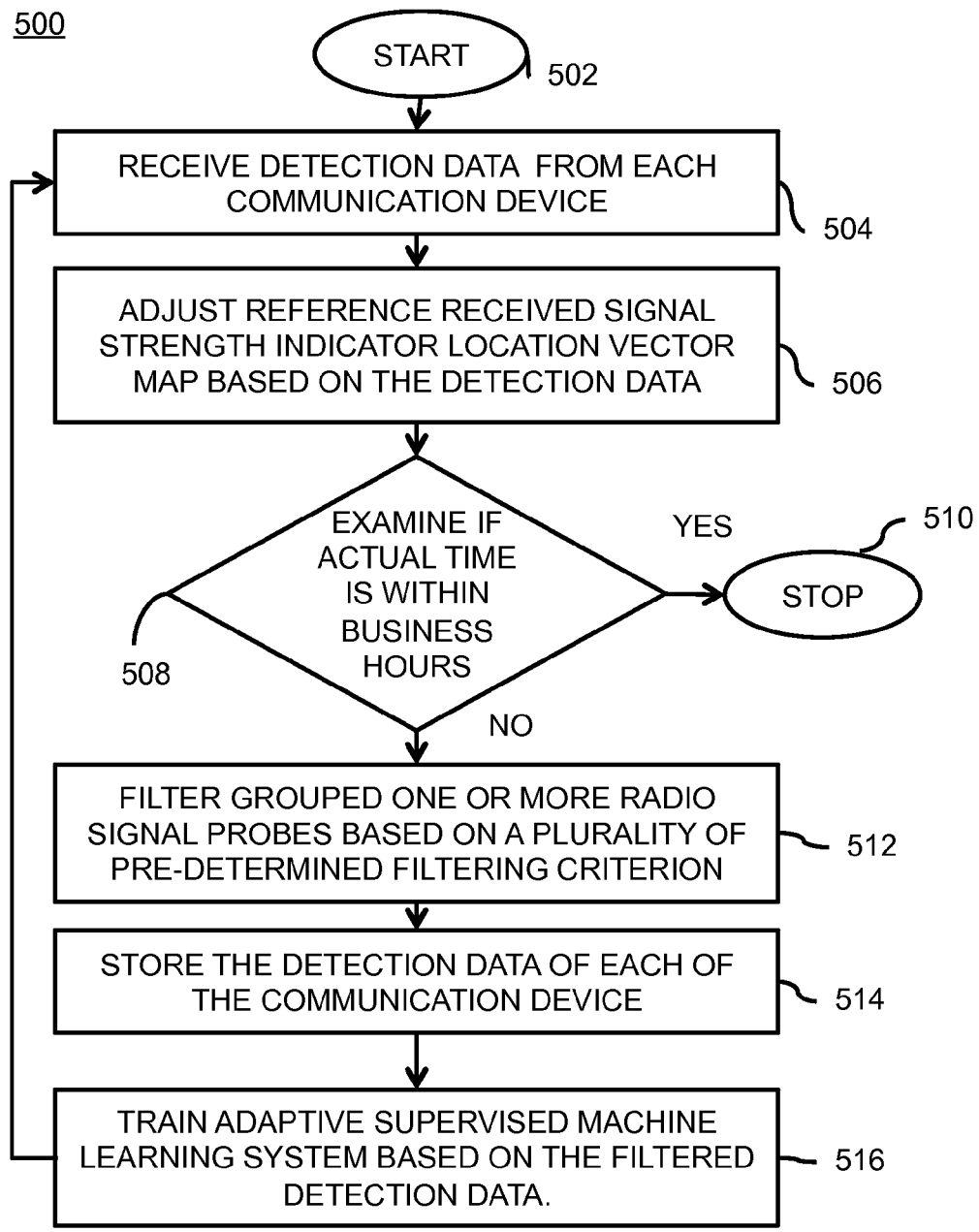
FIG. 5 illustrates a flowchart for showing operational flow for tracking the one or more portable communication devices according to an embodiment.

FIG. 5 illustrates a flowchart 500 for showing operational flow for tracking one or more portable communication devices in a radio communication network in a facility, in accordance with another embodiment of the present disclosure. The flowchart 500 initiates at step 502. Following step 502, at step 504, two or more sensors receive detection data from each of the communication device. At step 506, a server adjusts a reference received signal strength indicator location vector map based on the detection data. At step 508, the server examines business hours of the facility. If the actual time is found to be out-side business hours, then at step 512, the server filters the grouped one or more radio signal probes based on a plurality of pre-determined filtering criterion. At step 514, the server stores the detection data. At step 516, the server 118 trains an adaptive supervised machine learning system based on filtered detection data. However, if the actual time is found to be in-side business hours, then at step 510, the flowchart 500 terminates.

The steps 502 to 512 are only illustrative and other alternatives can also be provided where one or more steps are added, one or more steps are removed, or one or more steps are provided in a different sequence without departing from the scope of the claims herein.

Figure 6:
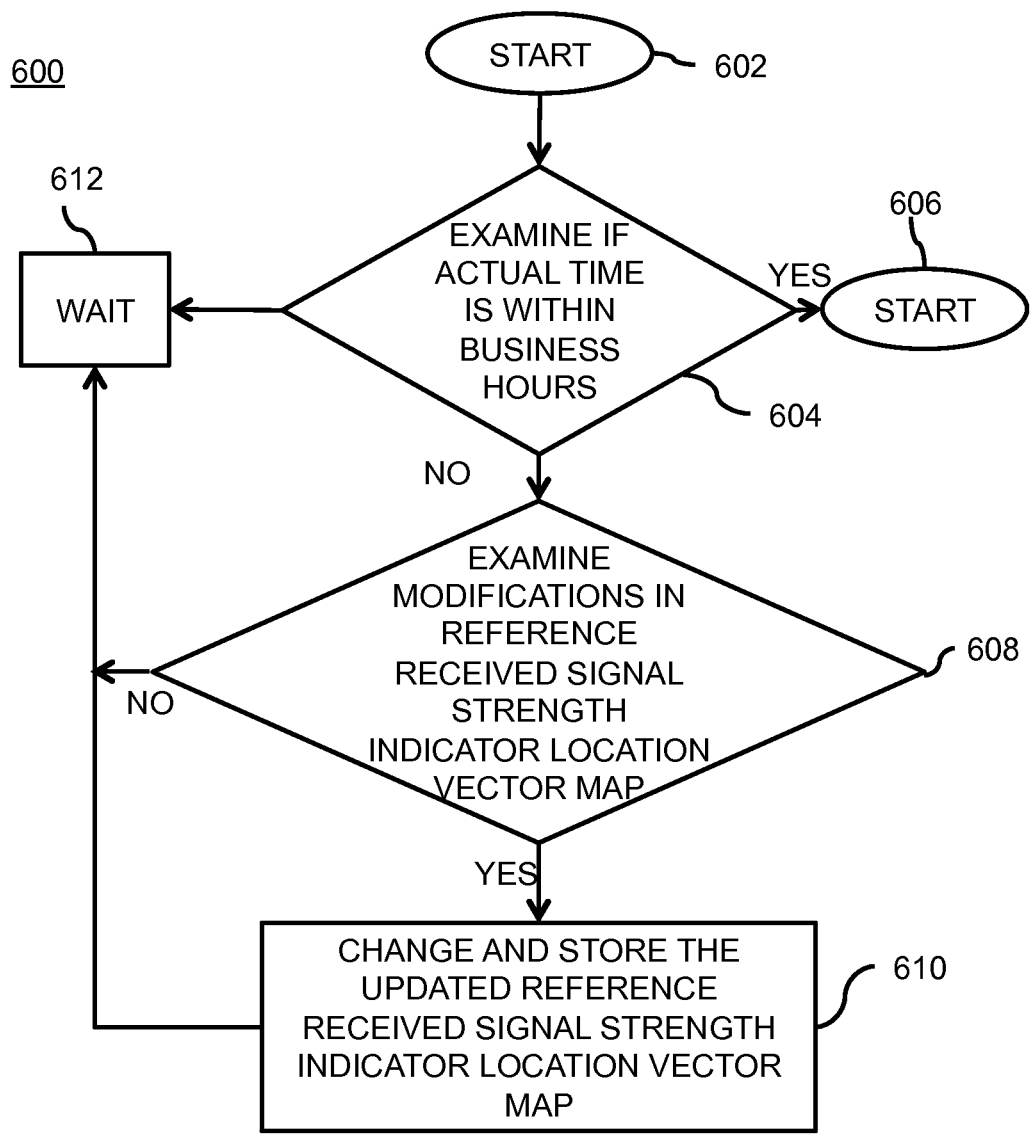
FIG. 6 illustrates a flowchart for training adaptive supervised machine learning system according to an embodiment.

FIG. 6 illustrates a flowchart 600 for training an adaptive supervised machine learning system, in accordance with an embodiment of the present disclosure. The flowchart 600 initiates at step 602. Following step 602, at step 604, a server examines the business hours of a facility. If the actual time is found to be out-side business hours, then at step 608, the server examines modifications in a reference received signal strength indicator location vector map. If the server finds changes in the reference received signal strength indicator location vector map, then at step 610, the server calibrate the changes and stores the updated reference received signal strength indicator location vector map. At step 612, the server waits and repeats the process step 604. However, if the actual time is found to be in-side business hours, then at step 606, the flowchart 600 terminates.

Figure 7:
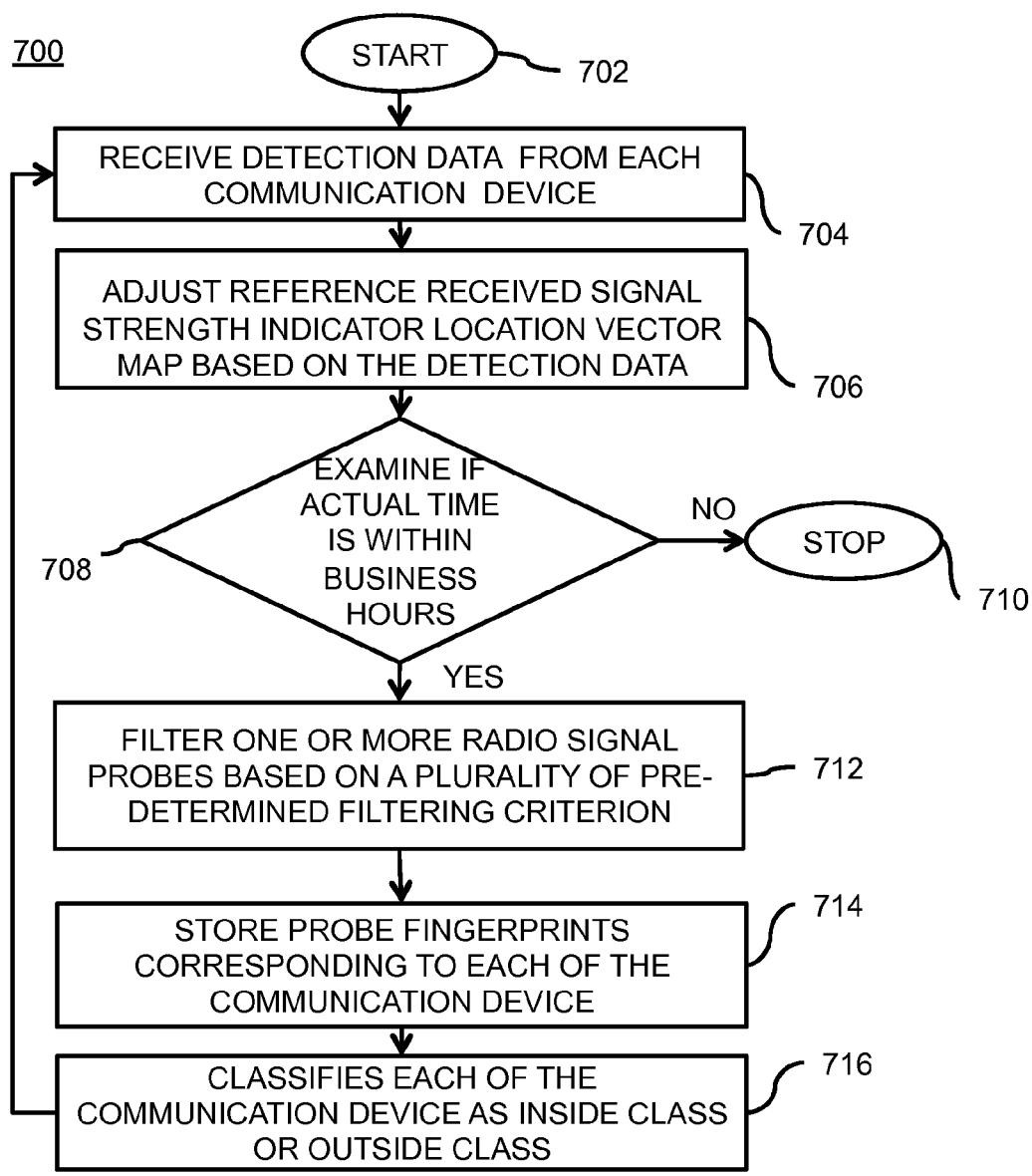
FIG. 7 illustrates a flowchart for extracting relevant probe fingerprints according to an embodiment.

The steps 602 to 612 are only illustrative and other alternatives can also be provided where one or more steps are added, one or more steps are removed, or one or more steps are provided in a different sequence without departing from the scope of the claims herein FIG. 7 illustrates a flowchart 700 for extracting relevant probe fingerprints of one or more radio signal probes, in accordance with an embodiment of the present disclosure. The flowchart 700 initiates at step 702. Following step 702, at step 704, sensors receives detection data such as probe fingerprints. At step 706, a server adjusts a reference received signal strength indicator location vector map based on the detection data. At step 708, the server examines a business hours of the facility. If the actual time is found to be out-side business hours, then at step 712, the server filters the one or more radio signal probes based on a plurality of pre-determined filtering criterion. Following step 712, at step 714, the server stores the probe fingerprints corresponding to each of the communication device. At step 716, an adaptive supervised machine learning system classifies each of the communication devices as inside class or outside class. However, if the actual time is found to be in-side business hours, then at step 710, the flowchart 700 terminates.

The steps 702 to 716 are only illustrative and other alternatives can also be provided where one or more steps are added, one or more steps are removed, or one or more steps are provided in a different sequence without departing from the scope of the claims herein.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

The invention claimed is:

1. A system for tracking one or more portable communication devices in a radio communication network in a facility, the system comprising:
   two or more sensors, wherein each of said two or more sensors are configured to record detection data in the form of a radio signal strength corresponding to each of one or more radio signal probes from each of said one or more portable communication devices, by utilizing a corresponding media access control address of each of said one or more portable communication devices; and
   a server configured to:
   determine location coordinates of each of said one or more portable communication devices using the recorded radio signal strength and
   modify a reference received signal strength indicator location vector map based on the detection data; and
   while an actual time is outside of business hours of the facility;
   filter grouped radio signal probes of the one or more radio signal probes based on one or more filtering criterion; and
   store the detection data;
   the system further comprising an adaptive supervised machine learning system configured to initiate a learning cycle while the actual time is outside of business hours of the facility when a variation in one or more technical attributes of said radio communication network in the facility is detected, and is configured to classify said one or more radio signal probes based on at least one pre-defined criterion.

2. The system as recited in claim 1, wherein said server comprises:
   a grouping module configured to group said one or more radio signal probes based on a first set of pre-determined conditions;
   a filtering module configured to filter said grouped one or more radio signal probes based on a plurality of pre-determined filtering criterion; and
   a storing module configured to store a reference received signal strength indicator location vector map.

3. The system as recited in claim 1, wherein said one or more technical attributes of said radio communication network in the facility is selected from a group consisting of:
   a reference received signal strength indicator location vector map,
   location parameters of said two or more sensors in said radio communication network in the facility, and
   configuration parameters of said two or more sensors in said radio communication network in the facility.

4. The system as recited in claim 1, wherein the learning cycle of the adaptive supervised machine learning system is configured to use as training data probe signals collected out-side of business hours of the facility.

5. The system as recited in claim 1, wherein the at least one pre-defined criterion also comprises pre-defined media access control addresses.

6. The system as recited in claim 1, wherein said server is configured to receive said recorded radio signal strength corresponding to each of said one or more radio signal probes from each of said one or more portable communication devices from a first sensor of said two or more sensors.

7. The system as recited in claim 6, wherein said first sensor of said two or more sensors is configured to receive said recorded radio signal strength corresponding to each of said one or more radio signal probes at each of said one or more portable communication devices from said two or more sensors.

8. The system as recited in claim 1, wherein said server is configured to transmit a tracking information report pertaining to said tracking of said one or more portable communication devices to a third party.

9. A method for tracking one or more portable communication devices in a radio communication network in a facility, the method comprising:
   recording detection data in the form of a radio signal strength corresponding to each of one or more radio signal probes from each of said one or more portable communication devices by utilizing a corresponding media access control address of each of said one or more portable communication devices;
   determining location coordinates of each of said one or more portable communication devices using the recorded radio signal strengths and
   adjusting a reference received signal strength indicator location vector map based on the detection data; and
   while an actual time is outside of business hours of the facility;
   filtering grouped radio signal probes of the one or more radio signal probes based on one or more filtering criterion;
   store the detection data; and
   initiating a learning cycle of the adaptive supervised machine learning system when a variation in one or more technical attributes of said radio communication network in the facility is detected and classifying said one or more radio signal probes based on at least one pre-defined criterion.

10. The method as recited in claim 9, wherein said step of determining location coordinate comprises:
    grouping said one or more radio signal probes based on a first set of pre-determined conditions;
    filtering said grouped one or more radio signal probes based on a plurality of pre-determined filtering criterion; and
    storing a reference received signal strength indicator location vector map.

11. The method as recited in claim 9, wherein one or more technical attributes of said radio communication network in the facility is selected from a group consisting of
    a reference received signal strength indicator location vector map,
    location parameters of said two or more sensors in said radio communication network in the facility, and
    configuration parameters of said two or more sensors in said radio communication network in the facility.

12. The method as recited in claim 9, wherein the learning cycle of the adaptive supervised machine learning system uses as training data probe signals collected out-side of business hours of the facility.

13. The method as recited in claim 9, wherein the at least one pre-defined criterion also comprises pre-defined media access control addresses.

14. The method as recited in claim 9, wherein said server receives said recorded radio signal strength corresponding to each of said one or more radio signal probes from each of said one or more portable communication devices from a first sensor of said two or more sensors.

15. The method as recited in claim 14, wherein said first sensor of said two or more sensors receives said recorded radio signal strength corresponding to each of said one or more radio signal probes at each of said one or more portable communication devices from said two or more sensors.

16. The method as recited in claim 9, wherein said server transmits a tracking information report pertaining to said tracking of said one or more portable communication devices to a third party.

\* \* \* \* \*